US012386985B2

(12) United States Patent
Clegg

(10) Patent No.: US 12,386,985 B2
(45) Date of Patent: Aug. 12, 2025

(54) HIGH SPEED PRIVATE AND SECURE CROSS-ENTITY DATA PROCESSING

(71) Applicant: Google LLC, Mountain View, CA (US)

(72) Inventor: Matthew Tran Clegg, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 172 days.

(21) Appl. No.: 18/368,811

(22) Filed: Sep. 15, 2023

(65) Prior Publication Data

US 2024/0104228 A1 Mar. 28, 2024

Related U.S. Application Data

(60) Provisional application No. 63/376,209, filed on Sep. 19, 2022.

(51) Int. Cl.
*H04L 29/06* (2006.01)
*G06F 21/60* (2013.01)

(52) U.S. Cl.
CPC .................. *G06F 21/606* (2013.01)

(58) Field of Classification Search
CPC ... G06F 21/606; H04L 9/085; H04L 2209/08; H04L 2209/46; H04L 9/0894; G06Q 30/0277
See application file for complete search history.

(56) References Cited

U.S. PATENT DOCUMENTS

| 10,749,671 B2 * | 8/2020 | Teranishi | G06F 7/523 |
| 11,689,371 B2 * | 6/2023 | Yadlin | H04L 9/3247 |
| | | | 713/168 |
| 2019/0372765 A1 * | 12/2019 | Tegeder | H04L 9/085 |

FOREIGN PATENT DOCUMENTS

| JP | 2019205157 A * | 11/2019 | ............. H04L 9/085 |
| WO | WO-2019088979 A1 * | 5/2019 | ........... H04L 9/0618 |

OTHER PUBLICATIONS

Cramer, Ronald, Ivan Damgård, and Ueli Maurer. "General secure multi-party computation from any linear secret-sharing scheme." International Conference on the Theory and Applications of Cryptographic Techniques. Berlin, Heidelberg: Springer Berlin Heidelberg, 2000. (Year: 2000).*
Turban, Tiina. A Secure Multi-Party Computation Protocol Suite Inspired by Shamir's Secret Sharing Scheme. MS thesis. Institutt for telematikk, 2014. (Year: 2014).*

(Continued)

*Primary Examiner* — Shawnchoy Rahman
(74) *Attorney, Agent, or Firm* — Fish & Richardson P.C.

(57) ABSTRACT

Methods, systems, and apparatus, including computer programs encoded on a computer storage medium. In one aspect, a method includes receiving, from a content distributor, plan data specifying a set of distribution plans that cause distribution of content. Instructions are transmitted to publishers to submit secret shares of a multi-register sketch representing presentations of the content. A notification that the content distributor has requested an analysis of the presentations of the content is sent to a multi-party computing group. A result share of the analysis of the presentation of the content is received from multiple MPC devices in the MPC group. A set of result shares received from the of MPC devices are transmitted to the content distributor.

20 Claims, 5 Drawing Sheets

(56) References Cited

OTHER PUBLICATIONS

Eugster, Patrick, Giorgia Azzurra Marson, and Bertram Poettering. "A cryptographic look at multi-party channels." 2018 IEEE 31st Computer Security Foundations Symposium (CSF). IEEE, 2018. (Year: 2018).*

International Preliminary Report on Patentability in International Appln. No. PCT/US2023/032832, mailed on Apr. 3, 2025, 11 pages.

An et al., "Cardinality and Frequency Estimation Evaluation Framework," Jul. 6, 2020, retrieved on Nov. 28, 2023, retrieved from URL <https://github.com/world-federation-of-advertisers/cardinality_estimation_evaluation_framework/blob/master/doc/cardinality_and_frequency_estimation_evaluation_framework.md>, 21 pages.

Archibald et al., "The number of distinct values in a geometrically distributed sample," European Journal of Combinatorics, Jul. 11, 2006, 27(7):1059-1081.

Beaver et al., "The round complexity of secure protocols," Proceedings of the Twenty-Second Annual ACM Symposium on Theory of Computing, Apr. 1, 1990, pp. 503-513.

Damgard et al., "Unconditionally secure constant-rounds multi-party computation for equality, comparison, bits and exponentiation," Proceedings of Theory of Cryptography Conference, Mar. 4, 2006, pp. 285-304.

Dwork et al., "The algorithmic foundations of differential privacy," Foundations and Trends in Theoretical Computer Science, Aug. 10, 2014, vol. 9, Issues 3-4, 26 pages.

Flajolet et al., "Hyperloglog: the analysis of a near-optimal cardinality estimation algorithm," Proceedings of 2007 Conference on Analysis of Algorithms, Jan. 1, 2007, 21 pages.

Flajolet et al., "Probabilistic counting algorithms for data base applications," Journal of Computer and System Sciences, Oct. 1, 1985, 31(2):182-209.

Ghazi et al., "Multiparty reach and frequency histogram: Private, secure, and practical," Proceedings on Privacy Enhancing Technologies, Jan. 2022, pp. 373-395.

github.com[online], "World-federation-of-advertisers /cross-media-measurement," available on or before Dec. 12, 2023, via Internet Archive: Wayback Machine URL <https://web.archive.org/web/20231212100925/https://github.com/world-federation-of-advertisers/cross-media-measurement>, retrieved on Mar. 11, 2024, URL<https://github.com/world-federation-of-advertisers/cross-media-measurement>, 6 pages.

Hu et al., "How to make private distributed cardinality estimation practical, and get differential privacy for free," Cryptology ePrint Archive, Dec. 17, 2020, p. 1-29.

International Search Report and Written Opinion in International Appln. No. PCT/CN2023/032832, mailed on Dec. 7, 2023, 17 pages.

Keller, "MP-SPDZ: A versatile framework for multi-party computation," Proceedings of the 2020 ACM SIGSAC conference on computer and communications security, Oct. 30, 2020, pp. 1575-1590.

Nishide et al., "Multiparty computation for interval, equality, and comparison without bit-decomposition protocol," Proceedings of the 10th International Conference on Practice and Theory in Public-Key Cryptography, Apr. 2007, pp. 343-360.

Reistad et al., "Linear, constant-rounds bit-decomposition," Proceedings of 12th International Conference on Information Security and Cryptology, Dec. 2-4, 2009, pp. 245-257.

Reistad, "Multiparty comparison-an improved multiparty protocol for comparison of secret-shared values," Proceedings of International Conference on Security and Cryptography, Jul. 7, 2009, (1):325-330.

Shamir, "How to share a secret," Communications of the ACM, Nov. 1979, 22(11):612-613.

Wright et al., "Privacy-Preserving Secure Cardinality and Frequency Estimation," Google LLC, May 29, 2020, 20 pages.

Wright et al., "Private Reach & Frequency Estimators Evaluation Results," Dec. 17, 2020, retrieved on Nov. 28, 2023, retrieved from URL <https://github.com/world-federation-of-advertisers/cross_media_measurement_project_site/blob/master/public_papers/PRFE_results/Private%20Reach%20%26%20Frequency%20Estimators%20Evaluation%20Results.md>, 21 pages.

* cited by examiner

HIGH SPEED PRIVATE AND SECURE CROSS-ENTITY DATA PROCESSING

CROSS-REFERENCE TO RELATED APPLICATION

This application claims the benefit of U.S. Provisional Application No. 63/376,209, filed Sep. 19, 2022, and titled "HIGH SPEED PRIVATE AND SECURE CROSS-ENTITY DATA PROCESSING," which is incorporated by reference.

BACKGROUND

This specification relates to data processing and high speed private and secure cross-entity data processing. To support online privacy efforts many online entities limit the information that is provided to third parties. However, it can be difficult to perform analysis related on online activity without access to data about the online activity.

SUMMARY

In general, one innovative aspect of the subject matter described in this specification can be embodied in methods that include the actions of receiving, by a controller comprising one or more data processing apparatus and from a content distributor, plan data specifying a set of distribution plans that cause distribution of content with electronic documents from multiple online publishers; transmitting, by the controller, instructions for each given publisher among the multiple online publishers to submit secret shares of each register of a multi-register sketch representing presentations of the content at an electronic document provided by the given online publisher, wherein multiple secret shares for a given register is required to recover a value of the given register; transmitting, by the controller and to a plurality of multi-party computation (MPC) devices, a notification that the content distributor has requested an analysis of the presentations of the content distributed according to the set of distribution plans; receiving, by the controller and from each given MPC device among the plurality of MPC devices, a result share of the analysis of the presentation of the content distributed according to the set of distribution plans, wherein multiple result shares generated by the plurality of MPC devices are required to recover a final result of the analysis of the presentation of the content distributed according to the set of distribution plans; transmitting, by the controller and to the content distributor, a set of result shares received from the plurality of MPC devices. Other embodiments of this aspect include corresponding systems, apparatus, and computer programs, configured to perform the actions of the methods, encoded on computer storage devices.

These and other embodiments can each optionally include one or more of the following features. Methods can include the operations of receiving, by the plurality of MPC devices and from each given online publisher among the multiple online publishers, the secret shares of each register of the multi-register sketch representing the presentations of the content at the electronic document provided by the given publisher; computing, by the plurality of MPC devices and using the secret shares, a non-zero register count for each multi-register sketch received from the multiple online publishers without revealing individual values of registers in the multi-register sketch; and adding, by the plurality of MPC devices, random noise to the non-zero register count to obtain noisy result shares; and transmitting, by the plurality of MPC devices, the noisy result shares to the controller.

Computing the non-zero register count for each multi-register sketch can include computing a number of bits having a value of 1 in a union of multiple multi-register sketches received from the multiple online publishers.

Methods can include the operations of receiving, from the multiple online publishers, different bit strings; and performing a Boolean exclusive-or (XOR) on the different bit strings to obtain an output bit stream that is unknown to any of the multiple online publishers.

Methods can include determining the random noise based, at least in part, on the output bit stream. Determining the random noise can include converting the output bit stream into a one-hot vector having a specified bit length; and computing a dot product of the one-hot vector and a quantile vector of the specified bit length, wherein the quantile vector represents quantiles of a discrete Gaussian distribution.

Methods can include computing a frequency vector representing, for each number of presentations between one and a specified number, how many different users were presented content distributed according to the set of distribution plans different numbers of times between one and the specified number.

Particular embodiments of the subject matter described in this specification can be implemented so as to realize one or more of the following advantages. The techniques discussed in this specification enable analysis of data collected by multiple different entities without any of the entities having to reveal the values of their data to other entities that collected the data. This advantage is achieved by utilizing a protocol that leverages a combination of secret shares, multi-party computation, encryption, and random noise. The solutions provided by the techniques discussed herein are up to 100 times faster than prior proposed solutions (e.g., using El-Gamal encryption) because it requires less differential privacy to be added than prior proposed solutions, which reduces the number of multiplication operations that need to be performed by the multi-party computing group and reduces the amount of time required to generate a result. The use of less differential privacy also leads to more accurate results over previously proposed solutions because the results are less noisy.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification describes techniques for processing data from multiple entities in a fast and secure manner, while protecting user privacy. For example, data regarding user interactions at different online properties provided by different publishers can be aggregated and analyzed without revealing the user information or the actual values representing numbers of user interactions at the different online properties. As in detail below, this is accomplished by using multiple secret shares of data that are provided to a multi-party computing ("MPC") group, which contains multiple different MPC devices, and each of the different MPC devices performs a portion of the analysis of the data without revealing the individual values contained in the respective secret shares. Additionally, to protect user privacy, random noise is added to the results computed by each of the MPC devices in a manner such that a party requesting the analysis can recover an accurate estimate of desired metrics. A particular use case for the techniques discussed herein is related to determining a total number of unique users who were presented with content provided by a particular content provide and a frequency distribution, which can be in the form of a frequency vector, representing how many times the same users saw the content. More generally, these techniques can be used to determine a total count of event occurrences and a distribution frequency of those occurrences in a privacy preserving manner.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component.

Figure 1:
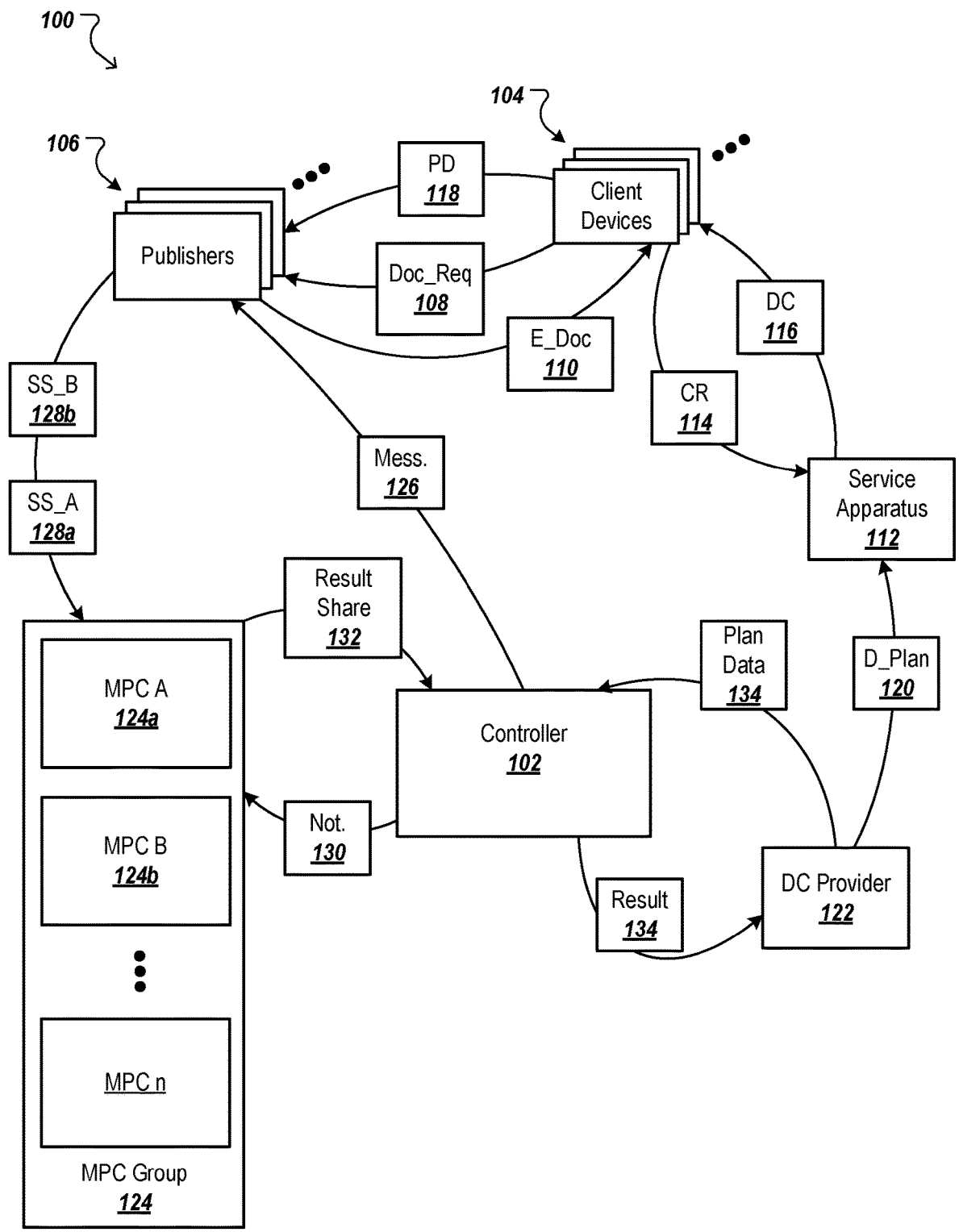
FIG. 1 is a block diagram of an example environment in which cross-entity data analysis can be performed.

FIG. 1 is a block diagram of an example environment 100 in which cross-entity data analysis can be performed. The environment 100 includes a controller 102 that coordinates the analysis of data, as described in detail below. In some implementations, the data being analyzed represents user interactions with content at client devices 104.

A client device 104 is an electronic device that is capable of requesting and receiving resources over a network. Example client devices 104 include personal computers, mobile communication devices (e.g., phones or tablets), digital assistant devices, wearable devices, and other devices that can send and receive data over a communications network. A client device 104 typically includes a user application, such as a web browser, to facilitate the sending and receiving of data over the network, but native applications executed by the client device 104 can also facilitate the sending and receiving of data over the network.

Digital assistant devices include devices that have a microphone and a speaker. Digital assistant devices are generally capable of receiving input by way of voice (e.g., using a microphone), and respond with content using audible feedback (e.g., using a speaker), and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

The client devices 104 enable users to interact with electronic documents that are provided by publishers 106. For example, the client devices 104 can submit document requests 108 ("Doc_Req") to various publishers 106 that request presentation of electronic documents provided by the publishers 106. In response to the requests, the electronic documents requested 110 ("E_Doc") can be transmitted over the network to the client devices 104 that requested the electronic documents 110.

An electronic document is data that presents a set of content at a client device 104. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents.

In some implementations, the publishers 106 can include servers that host publisher websites. In this example, the client device 104 can initiate a request for a given publisher webpage, and the publisher server that hosts the given publisher webpage can respond to the request by sending machine executable instructions that initiate presentation of the given webpage at the client device 104.

In another example, the publishers 106 can include video servers from which client devices 104 can download videos (e.g., user created videos or other videos). In this example, the client device 104 can download files required to play the video in a web browser or a native application configured to play a video.

Electronic documents can present a variety of content. For example, an electronic document can present static content (e.g., text or other specified content) that is within the electronic document itself and/or does not change over time. Electronic documents can also present dynamic content that may change over time or on a per-request basis. For example, a publisher of a given electronic document can maintain a data source that is used to populate portions of the electronic document. In this example, the given electronic document can include a script that causes the client device 104 to request content from the data source when the given electronic document is processed (e.g., rendered or executed) by a client device 104. The client device 104 integrates the content obtained from the data source into the given electronic document to create a composite electronic document including the content obtained from the data source and content obtained from the publisher 106.

In some situations, a given electronic document can include a digital component script that references a service apparatus 112 that is implemented with computer circuitry, or a particular service provided by the service apparatus 112. In these situations, the digital component script is executed by the client device 104 when the given electronic document is processed by the client device 104. Execution of the digital component script configures the client device 104 to generate a request for digital components 114 (referred to as a component request, "CR"), which is transmitted over the network to the service apparatus 112. For example, the digital component script can enable the client device 104 to generate a packetized data request including a header and payload data. The component request 114 can include event data specifying features such as a name (or network location) of a server from which the digital component is being requested, a name (or network location) of the requesting device (e.g., the client device 104), and/or information that the service apparatus 112 can use to select one or more digital components, or other content, provided in response to the component request 114.

The component request 114 can include event data specifying other event features, such as the electronic document 110 being requested by the client device 104 and characteristics of locations of the electronic document 110 at which digital component can be presented. For example, event data specifying a reference (e.g., URL) to an electronic document (e.g., webpage) in which the digital component will be presented, available locations of the electronic documents that are available to present digital components, sizes of the available locations (e.g., portions of a page or durations within a video), and/or media types that are eligible for presentation in the locations can be provided to the service apparatus 112. Similarly, event data specifying keywords associated with the electronic document ("document keywords") or entities (e.g., people, places, or things) that are referenced by the electronic document can also be included in the component request 114 (e.g., as payload data) and provided to the service apparatus 112 to facilitate identification of digital components that are eligible for presentation with the electronic document 110. The event data can also include a search query that was submitted from the client device 104 to obtain a search results page (e.g., that presents general search results or video search results).

Component requests 114 can also include event data related to other information, such as information that a user of the client device has provided, geographic information indicating a state or region from which the component request was submitted, a language setting of the client device, or other information that provides context for the environment in which the digital component will be displayed (e.g., a time of day of the component request, a day of the week of the component request, a type of device at which the digital component will be displayed, such as a mobile device or tablet device). Component requests 114 can be transmitted, for example, over a packetized network, and the component requests 114 themselves can be formatted as packetized data having a header and payload data. The header can specify a destination of the packet and the payload data can include any of the information discussed above.

The service apparatus 112 chooses digital components (e.g., video files, audio files, images, text, and combinations thereof, which can all take the form of advertising content or non-advertising content) that will be presented with the given electronic document in response to receiving the component request 114 and/or using information included in the component request 114. In some implementations, a digital component is selected in less than a second to avoid errors that could be caused by delayed selection of the digital component. For example, delays in providing digital components in response to a component request 114 can result in page load errors at the client device 104 or cause portions of the electronic document to remain unpopulated even after other portions of the electronic document are presented at the client device 104. Also, as the delay in providing the digital component to the client device 104 increases, it is more likely that the electronic document will no longer be presented at the client device 104 when the digital component is delivered to the client device 104, thereby negatively impacting a user's experience with the electronic document. Further, delays in providing the digital component can result in a failed delivery of the digital component, for example, if the electronic document is no longer presented at the client device 104 when the digital component is provided.

The service apparatus 112 identifies the selected digital component(s) 116 ("DC") to the client device 104 as a response to the content request 114. In some implementations, the digital component 116 is provided by the service apparatus 112 (as shown), and in some implementations, the information provided to the client device 114 instructs the client device to retrieve the digital component from a specified network location. Upon receipt of the data identifying the digital component 116 (and potentially retrieving the digital component from an identified network location), the client device 104 presents the digital component 116 with the electronic document 110 obtained from the publisher 106. The digital component 116 can either be presented within the electronic document 110, at the same time as the electronic document 110, or prior to/after the presentation of the electronic document. In any event, presentation of the digital component 116 at the client device 104 initiated by presentation of the electronic document 110 constitutes a user interaction with the digital component 116 that corresponds to presentation of the electronic document 110 provided by the publisher 106 that provided the electronic document 110.

In some situations, a publisher 106 will collect and store presentation data 118 that identifies various types of information, including: data identifying digital components that were presented with the publisher's electronic documents, identifiers representing users to whom the digital components were presented, contextual information (e.g., day, time, etc.) related to the presentation of each digital component, and/or other information relevant to the presentation of the digital component (e.g., an identifier of the service apparatus 112 that selected the digital component and/or an identifier of a content provider for whom the digital component is being distributed). In some implementations, the presentation data 118 stored by the publisher 106 can include information identifying a distribution plan that caused distribution of the digital component to the client device for presentation with the publisher's electronic document.

A distribution plan is a set of conditions that, when met, trigger presentation of a digital components provided by a particular digital component provider. For example, a set of conditions can specify times of day, days of week, and other criteria that must be met in order for a given digital component (or set of multiple digital components) to be eligible for delivery to client device 104. Additionally, or alternatively, the set of conditions can specify types of electronic documents with which the given digital component is eligible for presentation and/or specific publishers that an electronic document must be provided by in order for the digital component to be eligible for presentation. As such, the distribution plan for the given digital component will limit the distribution of the given digital component.

A digital component provider 122 can upload a distribution plan 120 ("D Plan") to the service apparatus 112 to control distribution of the digital component 116 to client devices 114. Alternatively, or additionally, the service apparatus 112 can provide a user interface that enables the digital component provider 122 to create a distribution plan for the digital component 116 (or a set of multiple digital components).

Given that the distribution plan 120 for a given digital component (or set of multiple digital components) limits the audience that may be presented the given digital component, it can be beneficial for the digital component provider 122 to review certain distribution metrics for the distribution plan to evaluate whether the distribution plan is operating as intended, or whether the distribution plan needs adjustments. For example, common metrics related to the distribution of online content include how many unique users are being presented the online content and the frequency with which the users are being presented with the content (e.g., a user frequency distribution, which can take the form of a frequency vector). However, because a given digital component is presented with electronic documents provided by various publishers, and those publishers generally do not want to share their audience information included in the presentation data 118 with other publishers, it is generally not possible to directly obtain the information from the publishers needed for the desired analysis. Furthermore, because the data needed to perform the desired analysis relates to presentation of the given digital component to individual users, the data is particularly sensitive, such that performing the analysis absent privacy precautions can lead to user data leaks.

To facilitate analysis of the presentation data 118 collected by multiple different publishers in a secure manner, and while maintaining user privacy, the environment includes a controller 102 that coordinates the collection and analysis of the data required for the analysis. The controller 102 includes one or more data processing apparatus and a memory device. The controller 102 is in communication with the digital component provider 120 (and other digital component providers), the publishers 106, and an MPC group 124, which includes multiple multi-party computing devices 124a-124n, as discussed in more detail below. In general, the controller 102 instructs the publishers 106 regarding the data to be provided to the MPC group 124, and informs the MPC group 124 of the analysis to be performed on the data received from the publishers 106. Once the analysis is performed by the MPC group 124, the controller receives the output of the MPC group 124 in an encrypted form, which prevents the controller 102 from revealing the results, and reports the encrypted output to the digital component provider 122, which can reveal the results using a decryption key known to the digital component provider 122.

More specifically, when the digital component provider 122 is interested in obtaining analysis of data collected by multiple different publishers 106, e.g., across different entities, the digital component provider 122 can transmit plan data 134 specifying a set of distribution plans (e.g., one or more distribution plans) that cause distribution of one or more digital components with electronic documents provided by multiple different publishers. For example, the plan data 134 can include unique identifiers that differentiate one distribution plan from another, such as a unique name or another unique set of characters that enable the identification of a given distribution plan among multiple distribution plans.

After receiving the plan data 134, the controller 102 transmits one or more messages 126 ("Mess.") to the publishers 106 identifying the unique identifier for a given distribution plan (e.g., 120), and instructing the publishers 106 how to secretly submit data that the publishers 106 have collected corresponding to the given distribution plan identified by the unique identifier. For example, the controller 102 can indicate that each publisher 106 is to identify presentation data (e.g., 118) that were collected and stored with an association to the unique identifier for the given distribution plan, and create secret sketch shares using the presentation data.

In accordance with the instructions contained in the one or more messages 126, each of the publishers 106 gather the presentation data 118 corresponding to presentations of digital components with their respective electronic documents (e.g., 110) at client devices 104. Using this gathered presentation data 118, the publishers 106 each create a sketch representing the presentations of the digital components that were presented with their respective electronic documents based on the given distribution plan identified by the unique identifier. The sketch created by a given publisher can include multiple different registers that each contains an identifier representing a user that was presented a digital component distributed according to the given distribution plan while visiting the given publisher's electronic document. The sketch created by the given publisher can then be divided into k secret shares, which are each transmitted to a different MPC devices within the MPC group 124. For example, assume that the sketch created by the given publisher is divided into two different secret shares. In this example, one of the secret shares, SS_A 128a, can be transmitted to MPC device A 124a, and the other secret share, SS_B 128b, can be transmitted to MPC device B 124b, such that neither of the MPC devices 124a and 124b obtains the actual values of the sketch, but the two secret shares of the sketch SS_A 128a and SS_B 128b can be used to recover the actual data from the sketch. In this example, the value k is 2, since two different secret shares were created to represent the sketch.

When the MPC devices 124a and 124b respectively receive a secret share of the sketch from a publisher 106, the MPC devices 124a and 124b can cooperate to perform the analysis requested by the controller 102. For example, after receiving the plan data 134 from the digital component provider 122, the controller 102 can send a notification 130 ("Not.") to each MPC device in the MPC group 124 notifying the MPC devices of the computation result that needs to be performed. Using the information provided in the notification 130, the MPC devices can compute the shares of the union of the sketches provided by the publishers 106, compute the non-zero register count for the union of the sketches, and add random noise to the non-zero register count to create a noisy result.

Once the requested analysis is complete, each of the MPC devices that performed the analysis on one of the sketch shares encrypts the result share obtained from the analysis (e.g., using a public key of the digital component provider), and transmits the encrypted result share 132 to the controller 102. The controller 102 receives these encrypted result shares, and transmits these encrypted result shares, as a result 134, to the digital component provider 122, which can decrypt the encrypted result shares of the result 134 using a decryption key known to the digital component provider, and recover the noise modified shares (e.g., noisy result). The digital component provider 122 can then proceed to recover or compute the estimated cardinality of the users who were presented digital components distributed using the distribution plan 120. For example, if the estimated cardinality of the users was computed by the MPC group 124, and reported in separate encrypted shares of the result 134, the digital component provider 122 would only need to decrypt the shares and recover the computed value from the decrypted shares. If the estimated cardinality was not already computed by the MPC group 124, the digital component provider 122 could use the unencrypted share information recovered from the result 134 to compute the cardinality. Alternatively, the digital component provider 122 could utilize a partially homomorphic encryption scheme, such that the controller 102 could combine the encrypted shares to obtain an encrypted version of the estimated cardinality, which could then be sent as the result 134, and decrypted by the digital component provider 122. Additional details of the operations discussed above are provided with respect to the figures that follow.

Figure 2:
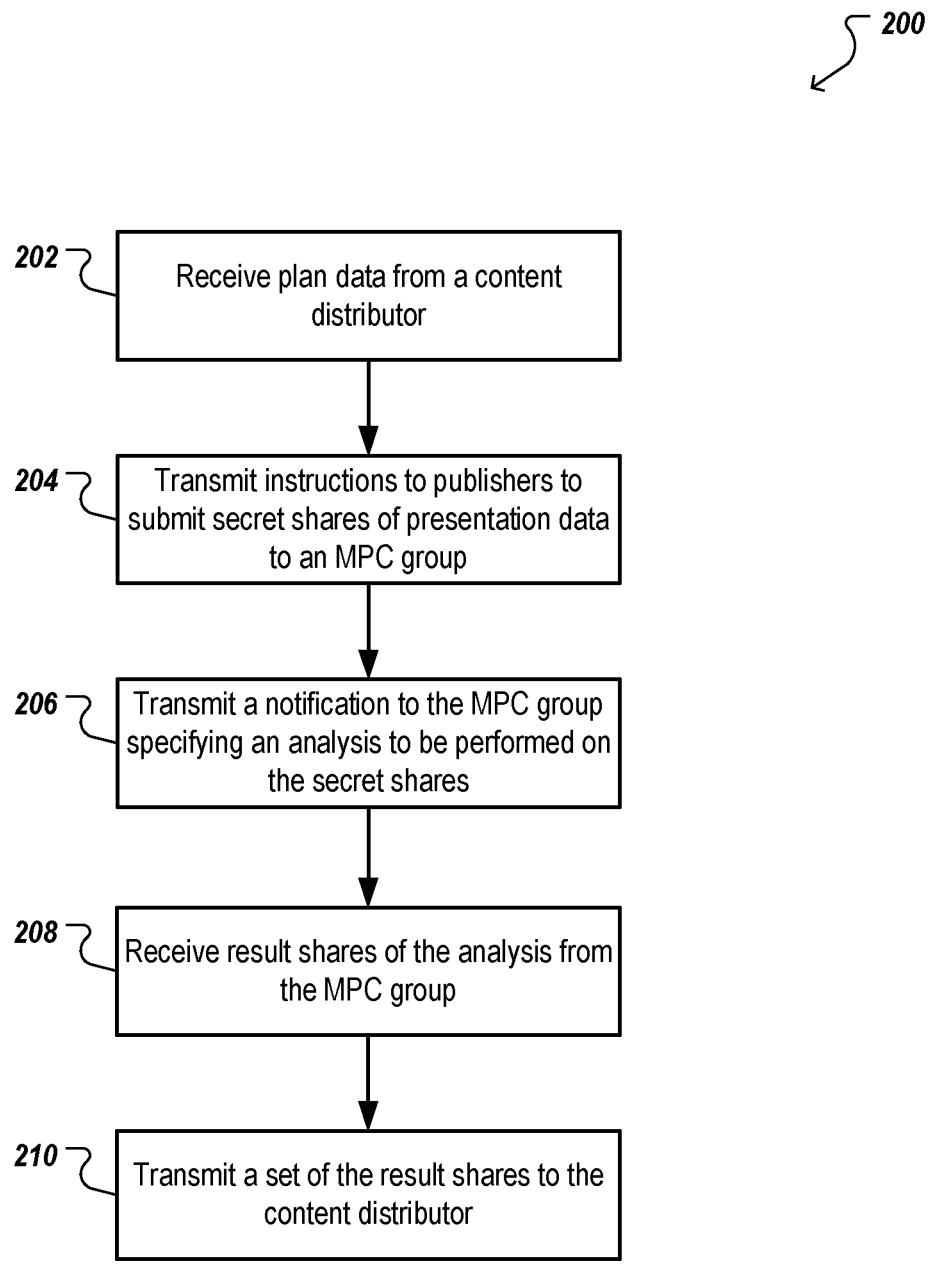
FIG. 2 is a flow chart of an example process of securely processing data collected by multiple entities in a privacy preserving manner.

FIG. 2 is a flow chart of an example process 200 of securely processing data collected by multiple entities in a privacy preserving manner. Operations of the process 200 can be performed, for example, by the controller 102 of FIG. 1, or another data processing apparatus. The operations of the process 200 can also be implemented as instructions stored on a computer readable medium, which can be non-transitory. Execution of the operations by one or more data processing apparatus cause the one or more data processing apparatus to perform operations of the process 200.

Plan data is received from a content distributor (202). In some implementations, the plan data can be received by a controller that is implemented using one or more data processing apparatus. The plan data specify a set of distribution plans that cause distribution of content with electronic documents from multiple online publishers. For example, as discussed with reference to FIG. 1, each of the distribution plans can include a set of conditions that, when met, trigger distribution of digital components for presentation with electronic devices provided by multiple different publishers. Each distribution plan can be uniquely identified relative to other distribution plans using an identifier that is unique to that distribution plan. For example, the identifier for the distribution plan can be a hash of a combination of a name (or other identifier) of the content distributor and a time at which the distribution plan was created, or other data that changes.

In some situations, the plan data can also specify authorized publishers that have been selected to present the digital components provided by the content distributor. For example, assume that the content distributor creates a particular distribution plan specifying that its digital components are to be distributed for presentation only with electronic documents provided by publisher A, publisher B, and publisher C. In this example, the plan data provided to the controller by the content distributor can identify publisher A, publisher B, and publisher C as entities that will be collecting data corresponding to presentations of the digital components distributed according to that particular distribution plan. As such, the controller is informed of the publishers that the controller should contact to obtain data related to presentation of digital components distributed according to the particular distribution plan.

The plan data received by the controller can also specify one or more metrics that the content distributor wants computed for the distribution plan. For example, the plan data can specify that the content distributor would like a report on how many unique users were presented digital components distributed according to the distribution plan. Additionally, or alternatively, the plan data can specify that a frequency distribution should also be computed for the distribution plan. The frequency distribution for a distribution plan indicates how many times sets of users were presented the digital components distributed according to the distribution plan, and can computed as a frequency vector. For example, the frequency distribution will indicate how many users were presented the digital components once, twice, three times, etc. As a simple example, the frequency distribution could specify that 10 users were presented digital components distributed according to the distribution plan once, 15 users were presented the digital components twice, and 5 users were presented the digital components three times. The manner in which the number of unique users and frequency distribution are computed is discussed in more detail with reference to FIG. 4.

Instructions to submit secret shares of presentation data to an MPC group are transmitted to a set of publishers (404). In some implementations, the controller sends the instructions to each of the publishers identified in the plan data received from the content distributor. For example, if the distribution plan created by the content distributor limits distribution of digital components with electronic documents provided by a specified set of publishers, the plan data can identify those publishers. In turn, the controller can identify the specified publishers in the plan data and transmit the instructions to only those publishers.

In some situations, the controller can transmit the instructions to all of the publishers that have digital components provided for presentation with their electronic documents by a specified service apparatus. For example, assume that the distribution plan specified in the plan data received from the content distributor is carried out by service apparatus A, and not service apparatus B. In this situation, the controller can transmit the instructions to those publishers that have service apparatus A provide digital components for presentation with their electronic documents. The controller need not transmit the instructions to publishers that do not have service apparatus A provide digital components since the distribution plan is carried out by service apparatus A.

The instructions can specify the distribution plan for which the secret shares are being created so that each publisher can identify the appropriate presentation data to use in creating the secret shares. For example, the instruction can include the unique identifier for the distribution plan and any other data needed for the publisher to identify the appropriate presentation data. The instruction can also identify the network location to which the publishers should transmit the secret shares in order to provide the secret shares to the MPC group that will be performing analysis on the secret shares. For example, the instructions can identify a URL ("Uniform Resource Locator"), an IP ("Internet Protocol") address, or another network location at which the publisher can contact the MPC group that will perform the analysis on the secret shares.

The creation of secret shares is discussed in detail with reference to FIG. 3, but generally, the instructions transmitted to the publishers instruct the publishers to each collect the presentation data corresponding to the distribution plan, and create multi-register sketches representing presentations of digital components distributed according to the distribution plan with the electronic documents of the publisher. The instructions also instruct the publishers to divide the values of the registers of the sketch into a specified number of secret shares in a way that each secret share of a given register is required to recover a value of that register.

A notification specifying an analysis to be performed on the secret shares is transmitted to the MPC group (206). In some implementations, transmission of the notification to the MPC group includes transmitting the notification to multiple MPC devices that are part of the MPC group, such that each of the MPC devices is on notice that it will be receiving secret shares for a given distribution plan. The notification can also indicate that the content distributor has requested an analysis of the presentations of digital components distributed according to the given distribution plan, and specify what analysis should be performed on the secret shares. For example, the notification can indicate that the MPC devices are to compute a total number of unique users who were presented digital components distributed according to the distribution plan. The notification can also indicate that the MPC devices are to compute a frequency distribution for the distribution plan. The details of the analysis performed by the MPC group is discussed below with reference to FIG. 4.

Secret result shares of the analysis performed on the secret shares are received from the MPC group (208). In some implementations, the controller receives the result shares from each given MPC device among the multiple MPC devices that are part of the MPC group performing the analysis on the secret shares provided by the publishers. Each result share is generated based on the analysis of the secret shares representing the presentations of digital components distributed according to the given distribution plan, and multiple, if not all, of the result shares generated by the MPC device are required to recover a final result of the analysis of the presentation of content distributed according to the given distribution plan. For example, because the final result is divided into multiple secret result shares, the final result represented by those secret shares cannot be obtained without having all of the secret result shares. In some implementations, each of the secret result shares received is also encrypted using a public key of the content distributor, such that the individual secret result shares cannot be revealed without the private key of the content distributor. This prevents the controller from being able to inspect the contents of the individual secret result shares, or obtain the final result. Furthermore, the secret result shares can also have random noise applied to them prior to being transmitted, such that the final result can be differentially private, which can be referred to as a noisy result.

A set of the secret result shares received from the MPC devices is transmitted to the content distributor (e.g., digital component distributor) (210). In some implementations, the controller sends the encrypted versions of the secret result shares to the content distributor, and the content distributor can use its private key to decrypt the encrypted secret result shares. In turn, the content distributor can combine the secret result shares to obtain an estimation of the metrics computed by the MPC group. For example, the content distributor can combine all of the secret shares to obtain the final result, but assuming the final result of a frequency distribution also had random noise applied to it to achieve differential privacy, the combination of the secret result shares will not provide the true underlying values of a histogram representing the frequency distribution. However, assuming that the content distributor is also provided with an estimate of the total number of users who were presented digital components distributed according to the distribution plan, the content distributor can perform simple mathematical operations to recover accurate estimates of the values of the histogram representing the frequency distribution. For example, the content distributor can determine the relative proportion of users in each of the histogram bins, and multiply that number by the total estimated number of users presented the digital components to recover an accurate estimate of the frequency distribution.

Figure 3:
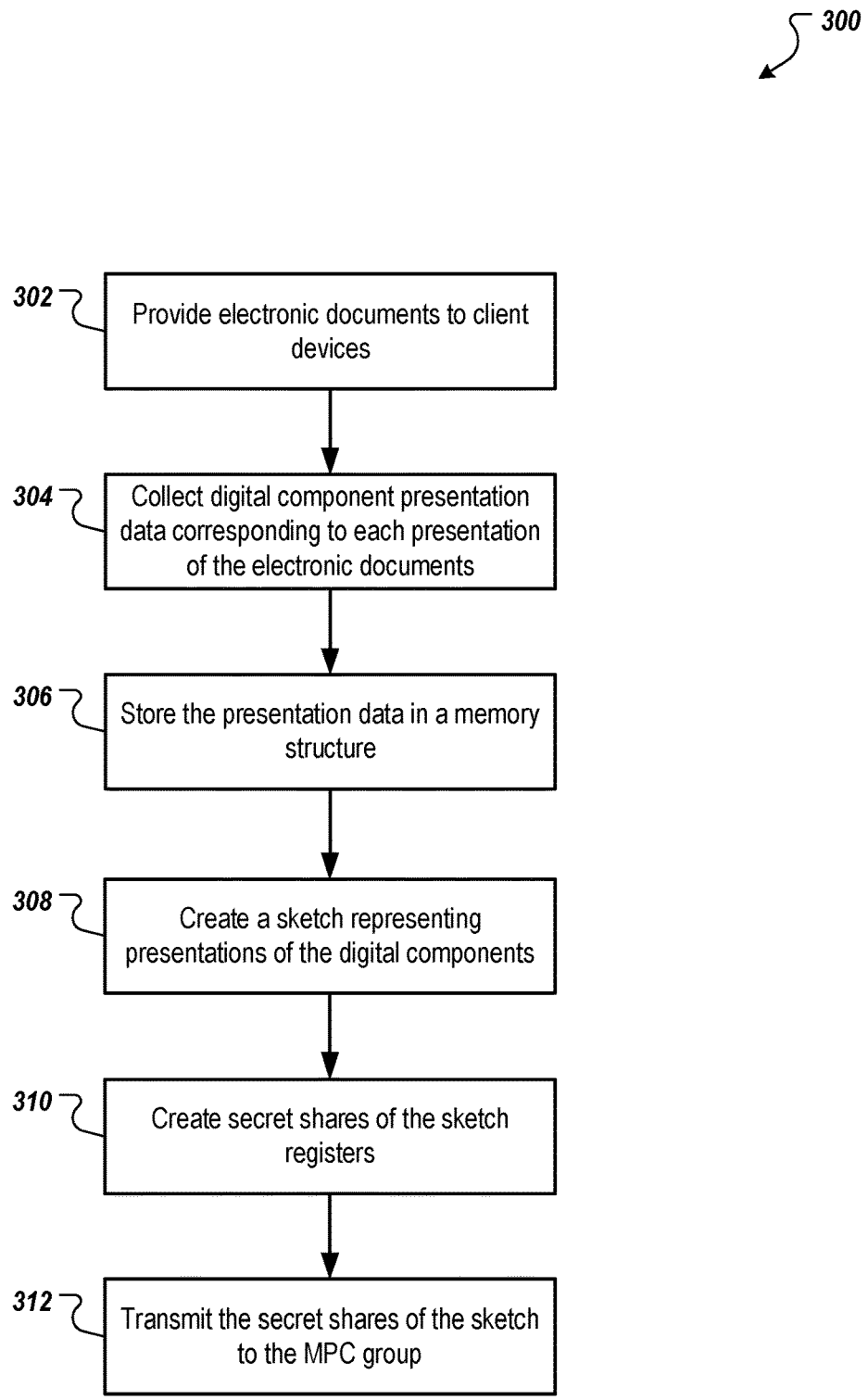
FIG. 3 is a flow chart of another example process of securely processing data collected by multiple entities in a privacy preserving manner.

FIG. 3 is a flow chart of another example process 300 of securely processing data collected by multiple entities in a privacy preserving manner. Operations of the process 300 can be performed, for example, by the publishers 106 of FIG. 1, or another data processing apparatus. The operations of the process 300 can also be implemented as instructions stored on a computer readable medium, which can be non-transitory. Execution of the operations by one or more data processing apparatus cause the one or more data processing apparatus to perform operations of the process 300.

Electronic documents are provided to client devices (302). The electronic documents can be provided to the client devices by publishers (e.g., server devices that host the electronic documents). As discussed above, the electronic documents can be web documents, native applications, or other electronic documents. The electronic documents can include scripts that request digital components from one or more service apparatus. In response to the request, the service apparatus identifies a distribution plan having conditions that are met by the information included in the request for digital components. For example, the service apparatus can identify a publisher of the electronic document from the request and/or other information related to the presentation of the electronic document and identify a given distribution plan having its conditions met by that combination of information. In turn, the service apparatus can provide (or identify) a digital component distributed according to the given distribution plan for presentation with the publisher's electronic document.

The publisher of an electronic document collects digital component presentation data corresponding to each presentation of digital components with the electronic document (304). In some implementations, the presentation data collected can include an identifier of a user to whom the electronic data, and therefore the digital component distributed according to the given distribution plan, was presented. The presentation data can also include additional information, such as an identifier of the electronic document with which the digital component was presented, a day of the presentation, a time of the presentation, and other available information related to the context of the presentation. The presentation data can also include a unique identifier of the distribution plan that triggered presentation of the digital component with the electronic document.

The presentation data is stored in a memory structure (306). The memory structure can be implemented in a memory device, and specify a structure by which the presentation data is stored. For example, the presentation data can be organized by (e.g., indexed to) a distribution plan identifier of the distribution plan that triggered presentation of the digital component with the publisher's electronic document. In a specific example, assume that a given distribution plan is identified by the identified 1XYY23. In this example, all of the presentation data that is collected with respect to presentations of digital components that were triggered by the given distribution plan can be stored with an association to (e.g., a link or logical reference) to the identifier 1XYY23 of the given distribution plan, such that all of the presentation data for the given distribution plan can be identified by the publisher through a query for the identifier 1XYY23. As such, when the publisher receives instructions to create secret shares using the presentation data for the given campaign, the publisher can query the stored presentation data using 1XYY23 to retrieve the presentation data for the given distribution plan.

A sketch representing presentations of digital components distributed according to a distribution plan is created by the publisher (308). In some implementations, the sketch is created in response to the publisher receiving instructions from the controller to create secret shares for the distribution plan. For example, the publisher can receive instructions from the controller identifying the given distribution plan with the identifier 1XYY23, and the publisher can use this information to retrieve the presentation data for digital components distributed according to the given distribution plan from the memory structure. Once the publisher has retrieved the presentation data, the publisher can create a multi-register sketch in which each register corresponds to a presentation of a digital component distributed according to the given distribution plan.

A sketch is a probabilistic data structure that allows one to approximately estimate the number of unique elements in a set. If S is a sketch data structure, then S supports three primitive operations:

Insert(S, x): Inserts the item x into the sketch S.

Union(S1, S2): Given two sketches S1 and S2, computes a sketch representing the union of the items that were inserted into the respective sketches.

Count(S): Estimates the total number of unique items inserted into the sketch S.

Examples of sketch data structures include HyperLogLog, HyperLogLog++, and LiquidLegions. A LiquidLegions sketch may be viewed as a vector of M registers, each of which may have a value of 0 or 1. It is assumed that there is a hash function h(x) that assigns an item to a randomly chosen register in the range 1-M, subject to the constraint that the probability that an item is hashed to the $i^{th}$ register is proportional to $e^{-\alpha i}$ for some $\alpha > 0$. To insert an item into a LiquidLegions sketch, its hash value is computed and the corresponding register is set to 1.

In the context of the present disclosure, and for purposes of example, each publisher can construct a LiquidLegions sketch (or another appropriate sketch) from the identifiers of users who were presented digital components with the publisher's electronic documents. All of the publishers will use the same hash function h(x), which can be identified in the instructions sent to the publisher by the controller, or otherwise communicated to the publisher.

In some implementations, the publishers create augmented sketches that have two values for each presentation to facilitate the computation of the frequency distribution for the distribution plan. The frequency distribution can provide an indication of how many users saw digital components from a given distribution plan each certain number of times. For example, the frequency distribution can take the form of a histogram in which the value of each bin represents the number of users who were presented digital components distributed according to the distribution plan a certain number of times. As such, for a given distribution plan, we can associate a frequency vector f, where f[i] is the number of people who were presented a digital component exactly i times. In practice, there can be a maximum value $i_{max}$, and $f[i_{max}]$ can be defined to be the number of people who saw the digital component i or more times.

To facilitate the computation of the frequency distribution, an augmented sketch is computed/created by each publisher. In addition to the hash function h(x) that is used for determining register assignments, a second hash function h'(x) is used to assign to each user a uniformly chosen random value from some large range. The $i^{th}$ register of the augmented sketch consists of a pair of values, $(f_i, q_i)$, where $q_i$ is the largest value of h'(x) for which h(x)=i, and $f_i$ is the number of presentations of the digital component to that user. If no users hash to register i, then we take $(f_i, q_i)$=0.

Secret shares of the sketch registers are created (310). In some implementations, the publisher can create the secret shares by dividing each register of the sketch into multiple different secret shares, such that multiple sketches are created that each include a set of the secret shares for the M registers of the sketch.

In a secret sharing scheme, a party who wishes to keep a value secret can create shares of the secret. They then distribute the shares of the secret to other parties, called shareholders (e.g., MPC computing devices). None of the shareholders can by themselves determine the secret from their own share. However, if a sufficient number of shareholders share their secrets with each other, they can reconstruct the original secret. A secret sharing scheme is defined by two parameters, k and n. The value n represents the number of shares that are created, and the number k represents the number of shares that must be shared in order to reconstruct the original secret.

There are a number of different secret sharing schemes that could be used. For example, the Shamir secret sharing scheme is defined over a finite field of order p. In order to share a value s, one starts by choosing a random polynomial f(x) of degree k−1 such that f(0)=s. The secret shares of s are the values f(1), f(2), . . . , f(n). Since there is a unique polynomial of degree k−1 that passes through a given set of k points, the polynomial f(x) can be recovered if k points are known. Once f(x) is determined, the secret is computed as f(0).

Another secret sharing scheme is called additive secret sharing. In an additive secret sharing scheme, n−1 random values $x_1, x_2, \ldots, x_{n-1}$ are chosen and the final share $x_n$ is chosen as $x_n = s - x_1 - x_2 - \ldots - x_{n-1}$. If all n shares are known, then the secret can be recovered as $s = x_1 + x_2 + \ldots + x_n$. If fewer than k shares are known, then nothing can be said about the secret. An additive secret sharing scheme is an example of a secret sharing scheme where the number shares needed to recover the secret is n.

Both the Shamir secret sharing scheme and the additive secret sharing scheme are trivially partially homomorphic. If x and y are secrets that have been shared, then a shareholder holding a share of x and a share of y can easily compute a share of x+y. In addition, for a publicly known value a, a shareholder holding a share of x can easily compute a share of the scalar product ax. Computing additions and scalar multiplications can be performed without communication among the shareholders. In some implementations, publishers can be instructed to use a specific secret sharing scheme to create the secret shares of the sketch registers that will be shared with the MPC group.

When the publishers have created the augmented sketches discussed above to support the computation of the frequency distribution, the publisher can compute shares for each of the values of each register. For example, for each register i of the augmented sketch, the publisher computes shares of $f'_i$ and shares of $q'_i$.

The secret shares of the sketch registers are transmitted to an MPC group (312). In some implementations, the publishers transmit the secret shares to the network location that was included in the instructions, or another network location known to the publisher to be the network location of the MPC group. The publisher can send each secret share to a separate MPC computing device in the MPC group.

Figure 4:
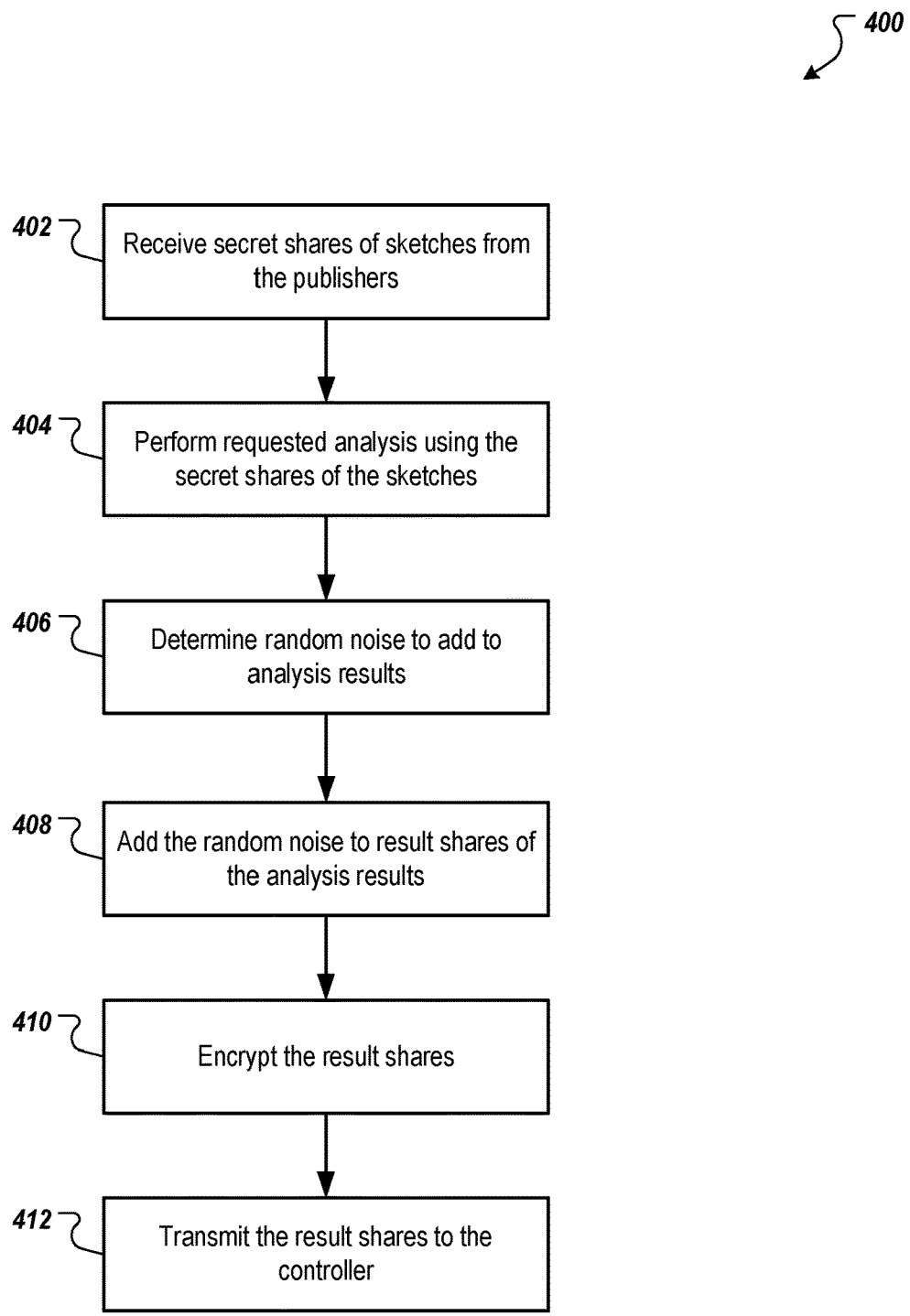
FIG. 4 is a flow chart of an example process of securely processing data collected by multiple entities in a privacy preserving manner.

FIG. 4 is a flow chart of an example process 400 of securely processing data collected by multiple entities in a privacy preserving manner. Operations of the process 400 can be performed, for example, by MPC devices in the MPC group 124 of FIG. 1, or another set of data processing apparatus. The operations of the process 400 can also be implemented as instructions stored on a computer readable medium, which can be non-transitory. Execution of the operations by one or more data processing apparatus cause the one or more data processing apparatus to perform operations of the process 400.

The MPC devices of the MPC group receive secret shares of sketch registers from the publishers (402). In some implementations, the MPC devices receive the secret shares of the sketch registers from each online publisher among multiple online publishers that were instructed to provide secret shares to the MPC group. For example, each MPC device can receive a different secret share of a given sketch register created by a given publisher, and each MPC device can receive secret shares from multiple different publishers. As discussed above, the secret shares of each register of a multi-register sketch represent the presentations of digital components distributed according to a given distribution plan with electronic documents provided by a publisher.

The MPC group performs the requested analysis using the secret shares of the sketch registers (404). As discussed above, there are various analysis that can be performed using the secret shares, and the notification provided to the MPC group by the controller can specify the specific analysis that is to be completed using the secret shares of the sketch registers received form the publishers. In some implementations, the requested analysis may be a total number of unique users who were presented digital components distributed according to a given distribution plan. In some implementations, the requested analysis may, additionally or alternatively, be a distribution frequency for the distribution plan.

As part of carrying out the requested analysis, the MPC devices of the MPC group can compute a non-zero register count for each multi-register sketch received from the multiple publishers that were instructed to provide secret shares of sketch registers to the MPC group. As noted above, performing the analysis on the secret shares of the sketch registers enables the analysis to be performed without revealing the individual values of the sketch registers.

To compute the non-zero register count, the MPC devices can compute a number of bits having a value of 1 in a union of multiple multi-register sketches received from the multiple online publishers. To illustrate, assume that $S_1$ and $S_2$ represent two sketches constructed as discussed above. Also assume that $S_1[i]$ represents the $i^{th}$ register of sketch $S_1$, and that $S_2[i]$ represents the $i^{th}$ register of sketch $S_2$, such that the $i^{th}$ register of the union of $S_1$ and $S_2$ can be computed as $S[i]=S_1[i]+S_2[i]-S_1[i]*S_2[i]$. This value will be either 0 or 1.

Given a LiquidLegions sketch S, the estimation of the number of unique elements in the set from which S was constructed can be performed in various ways. For example, the process can start by computing the total number of non-zero registers in S, as follows:

$$C(S) = \sum_{i=1}^{M} S[i]$$

From this value, an estimate n is obtained of the number of unique elements that were inserted into S. For example, one can estimate the expected number of non-zero registers C(S) associated to a given set size n and then invert this value using bisection to obtain an estimate n of n from C(S).

In situations where the requested analysis includes the computation of a frequency distribution, the MPC devices will operate on the secret shares of the registers of the augmented sketches discussed above with reference to FIG. 3. For purposes of illustration, assume there are two augmented sketches S' and S", and the goal is to compute the sketch S representing the union of the users that were inserted into S' and S". Suppose $S'[i]=(f'_i, q'_i)$ and $S"[i]=(f"_i, q"_i)$ In this example, the value of the it h register of S can be computed as follows:

$$S[i] = \begin{cases} f'_i, q'_i & \text{if } q"_i < q'_i \\ f"_i, q"_i & \text{if } q'_i < q"_i \\ f'_i + f"_i, q'_i & \text{if } q'_i = q"_i \end{cases}$$

Therefore, the number of unique users who were presented digital components distributed according to the distribution plan can be modified as follows so as to compute both the number of unique users and the frequency distribution. For example, each publisher computes an augmented sketch as discussed above, and provides that augmented sketch to the MPC group. The MPC devices in the MPC group cooperatively perform the following actions:

The MPC devices combine the augmented sketches to obtain an augmented sketch of the union.

In the augmented sketch of the union, each frequency $f_i$ is replaced by $\min\{f_i, i_{max}\}$.

The number of times that each frequency f occurs is counted, obtaining a histogram of frequency counts $h_1$, $h_2$, . . . , $h_{imax}$.

Random noise to add to the analysis results is determined (406). In some implementations, the random noise is added to achieve differential privacy and create a noisy result. For example, the random noise can be added to each component of the frequency distribution histogram discussed above. The determination of the random noise can be performed according to an arbitrary discrete distribution.

To illustrate, assume that there are p parties (e.g., publishers) that wish to jointly compute a value n+r, where n is some deterministic function of the inputs provided by the p parties, and r is distributed according to a discrete distribution. Each of the parties contributes their input in an encrypted manner to a secure MPC, which outputs the value n+r. The computation is performed in such a way that none of the participants learns anything about the inputs that were contributed by any of the parties (e.g., publishers) and such that none of the participants learns anything about the random value r that is added. In practice, the value of n can be some deterministic function of the inputs, such as the total number of unique people who were presented digital components distributed according to a given distribution plan (e.g., advertising campaign). Two examples of protocols that can be used to generate the random noise include a random quantile selection protocol and an inverse CDF ("Cumulative Distribution Function") protocol.

In the random quantile selection protocol, each publisher, l=1,2, . . . , p, contributes B random bits, $b_{i,1}, b_{i,2}, \ldots, b_{i,B}$. A bitwise exclusive-or is computed across the publisher's contributed random bits. For purposes of example, let $b'_i = b_{1,i} \oplus b_{2,i} \oplus \ldots \oplus b_{p,i}$ represent the exclusive-or of the $i^{th}$ bits. Then, as long as at least two publishers are honest (e.g., don't reveal their information), $b'_i$ will be uniformly random and unknown to any of the parties.

The bit string $(b'_1, b'_2, \ldots, b'_B)$ can be interpreted as the binary representation of a number c, where $0 \leq c \leq 2^B$. The value of r is then obtained by using c to perform a table-lookup in a table of quantiles of the target distribution. One way to perform such a table lookup is to convert c into a one-hot vector of length $2^B$ and then compute the dot-product of this one-hot vector with a vector of $2^B$ quantiles.

Let the quantiles be $q_1, q_2, \ldots, q_N$, where $N=2^B$. In other words, if F is the probability mass function of the target distribution, then $q_i=F-1(i/(2^B+1))$. To determine whether quantile $q_k$ is selected by c, it must be determined whether c=k. Let $h_k$ be the one-hot vector defined as $h_k=1$ if k=c and $h_k=0$ otherwise. To determine whether $h_k=1$, each bit in the binary representation of c is compared with the corresponding bit in the binary representation of k. To compare two bits in this way requires two multiplications. To compare B bits requires 3B−1 homomorphic multiplications with a circuit depth of $\log_2 B$. Since there are $2^B$ total possible values for k, the total number of multiplications required becomes (3B−1) $2^B$, although the circuit depth remains fixed at $2^B$ because these computations can be performed in parallel. Once $h_k$ has been computed, the value of r is given by the dot product r=h°q. Because q is a scalar, this does not require any additional homomorphic multiplications.

In the inverse CDF method a random real number between 0 and 1 is chosen. The CDF of the target distribution is inverted at this value to obtain a randomly chosen value. To use this method, a limited number of distinct values from the underlying distribution are allowed to be chosen. Let these values be and assume that they are given in order. Probabilities are defined as $p_0, p_1, \ldots, p_M+1$ as $p_0=0$, $p_i=F(x_i)$, $p_M=1$. Let u be a randomly chosen number between 0 and 1. Then, we take $r=x_i \leq u < p_i$.

More specifically, as with the previously described protocol, each publisher, $i=1, 2, \ldots, p$, contributes B random bits, $b_{i,1}, b_{i,2}, \ldots, b_{i,B}$. The bitwise exclusive-or is computed across the publisher's contributed random bits. For purposes of example, let $b'_i = b_{1,i} \oplus b_{2,i} \oplus \ldots \oplus b_{p,i}$ represent the exclusive-or of the $i^{th}$ bits. Then, as long as at least two publishers are honest (e.g., don't reveal their information), $b'_i$ will be uniformly random and unknown to any of the parties.

The bit string $(b'_1, b'_2, \ldots, b'_B)$ is interpreted as the bits of a number u between 0 and 1. In other words, $$u = \sum_{i=1}^{B} 2^{-i} b'_i$$

Let $h_i$, $i=1, 2, \ldots, M$, be 1 if $p_{i-1} \leq u \leq p_i$ and 0 otherwise. Once $h_i$ is computed, the value of r is then computed as the dot product $r=h_x$.

The computation of $h_i$ can be performed as follows. Suppose x and y are two real numbers between 0 and 1, and let x[i] (respectively y[i]) denote the $i^{th}$ bit in the binary representation of x (respectively y). Let j be the index of the first bit where x[j]<y[j]. Then, x<y iff x[j]=0 and y[j]=1. Thus, a strategy is to look at each of the B prefixes of the binary representations of x and y. If the prefixes are identical, then the next bit of x must be less than or equal to the corresponding bit of y. If this condition is satisfied for all prefixes, then x≤y. This can be captured by the following formula:

$$LE(x, y) = \bigwedge_{i=1}^{B} PREFIXEQ(x, y, i-1) \Rightarrow (x[i] \leq y[i])$$

In this formula, PREFIX $Q(x,y,i-1)$ is 1 if the first i−1 bits of x and y agree (e.g., are the same), and 0 otherwise. The implication P⇒Q can be computed with one multiplication, and the single bit comparison x[i]<y[i] can also be computed with a single multiplication.

To efficiently compute PREFIXE $Q(x,y,i)$ for $i=1, 2, \ldots, B$, let E $Q(x,y,i,j)$ be the Boolean function that is 1 if bits $i, i+1, \ldots, j-1$ of x are the same as the corresponding bits of y. The trivial case occurs when i=j−1. In this case, E $Q(x,y,i,i+1)$ can be computed with two multiplications. Suppose we have computed the values of E $Q(x,y,a2^k, (a+1)2^k)$ for a given value of k and for all permissible values of a. Then, $$E Q(x,y,a2^{k+1},(a+1)2^{k+1}) = E Q(x,y,(2a)a^k, (2a+1)a^k) \wedge E Q(x,y,(2a+1)a^k,(a+1)2^{k+1}).$$

Thus, E $Q(x,y,a2^{k+1},(a+1)2^{k+1})$ can be computed recursively from earlier values with a single multiplication. This can be thought of as a binary tree with B leaves. The $i^{th}$ leaf of the tree represents the expression x[i]=y[i]. The parent of two nodes is true if both subtrees are true. To compute each leaf requires two multiplications, and to compute each internal node requires one multiplication. So the total number of multiplications required by the tree is 3B−1. The height of the tree is $\log_2 B$.

Having computed this tree, the values E $Q(x,y,i,j)$ can be propagated back down the tree to compute the values of PREFIX(x,y,i). Building up the values of PREFIX(x,y,i) in this way requires no more than B additional multiplications. Thus, the total effort required to compute PREFIX(x,y,i) for all values of i is no more than 4B−1 multiplications, with a depth of $2 \log_2 B$.

Finally, to compute the conjunction over all values of i of (PREFIX(x,y,i)(x[i]y[1])) requires an additional 3B−1 multiplications and adds a depth of 2+log 2B. Hence, the total number of multiplications in the circuit is 7B−2, and the total depth is $3 \log_2 B + 2$.

Once the random noise has been determined, the random noise is added to the result shares of the analysis results (408). For example, when a histogram has been created for the frequency distribution, differentially private noise can be added to each value $h_1, h_2, \ldots, h_{imax}$ of the histogram (e.g., by the MPC devices), which creates a noisy result.

Two commonly used noise distributions are the Laplace distribution and the Gaussian distribution. If the output values are discrete, which is the case for estimating the size of a set, the discrete Laplace distribution and the discrete Gaussian distribution can be used. In the context of estimating set sizes from the register count of a set, noise is added to the register count and this noisy register count value is then used to estimate the set size. The invention described in this doc will work with any noise distribution defined on the integers.

The result shares are encrypted (410). In some implementations, the MPC devices that performed the analysis can use a public key of the content distributor to encrypt their respective shares of the analysis results. This will enable the content distributor to decrypt the shares using a corresponding private key, and prevent third parties who do not have the private key from accessing the result shares.

The result shares are transmitted to the controller (412). In some implementations, the MPC devices each transmit their respective result shares to the controller, which can then forward the result shares to the content distributor.

Figure 5:
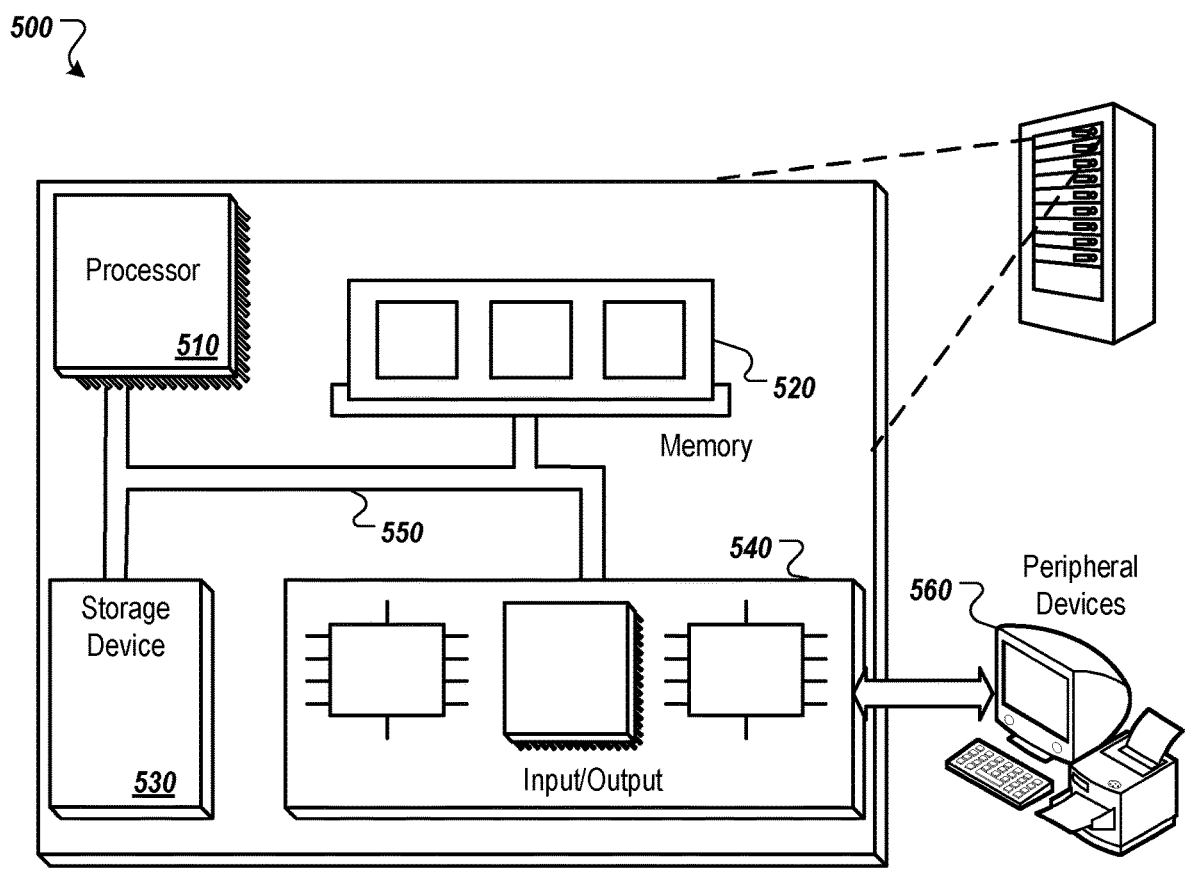
FIG. 5 is a block diagram of an example computer.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other peripheral devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
  receiving, by a controller comprising one or more data processing apparatus and from a content distributor, plan data specifying a set of distribution plans that cause distribution of content with electronic documents from multiple online publishers;
  transmitting, by the controller, instructions for each given publisher among the multiple online publishers to submit secret shares of each register of a multi-register sketch representing presentations of the content at an electronic document provided by the given online publisher, wherein multiple secret shares for a given register is required to recover a value of the given register;
  transmitting, by the controller and to a plurality of multi-party computation (MPC) devices, a notification that the content distributor has requested an analysis of the presentations of the content distributed according to the set of distribution plans;

receiving, by the controller and from each given MPC device among the plurality of MPC devices, a result share of the analysis of the presentation of the content distributed according to the set of distribution plans, wherein multiple result shares generated by the plurality of MPC devices are required to recover a final result of the analysis of the presentation of the content distributed according to the set of distribution plans;

transmitting, by the controller and to the content distributor, a set of result shares received from the plurality of MPC devices.

2. The method of claim 1, further comprising:

receiving, by the plurality of MPC devices and from each given online publisher among the multiple online publishers, the secret shares of each register of the multi-register sketch representing the presentations of the content at the electronic document provided by the given publisher;

computing, by the plurality of MPC devices and using the secret shares, a non-zero register count for each multi-register sketch received from the multiple online publishers without revealing individual values of registers in the multi-register sketch; and adding, by the plurality of MPC devices, random noise to the non-zero register count to obtain noisy result shares; and transmitting, by the plurality of MPC devices, the noisy result shares to the controller.

3. The method of claim 2, wherein computing the non-zero register count for each multi-register sketch comprises computing a number of bits having a value of 1 in a union of multiple multi-register sketches received from the multiple online publishers.

4. The method of claim 3, further comprising:

receiving, from the multiple online publishers, different bit strings; and performing a Boolean exclusive-or (XOR) on the different bit strings to obtain an output bit stream that is unknown to any of the multiple online publishers.

5. The method of claim 4, further comprising determining the random noise based, at least in part, on the output bit stream.

6. The method of claim 5, wherein determining the random noise comprises:

converting the output bit stream into a one-hot vector having a specified bit length; and computing a dot product of the one-hot vector and a quantile vector of the specified bit length, wherein the quantile vector represents quantiles of a discrete Gaussian distribution.

7. The method of claim 6, further comprising computing a frequency vector representing, for each number of presentations between one and a specified number, how many different users were presented content distributed according to the set of distribution plans different numbers of times between one and the specified number.

8. A non-transitory computer readable medium storing instructions that, upon execution by one or more data processing apparatus, cause the one or more data processing apparatus to perform operations comprising:

receiving, from a content distributor, plan data specifying a set of distribution plans that cause distribution of content with electronic documents from multiple online publishers;

transmitting instructions for each given publisher among the multiple online publishers to submit secret shares of each register of a multi-register sketch representing presentations of the content at an electronic document provided by the given online publisher, wherein multiple secret shares for a given register is required to recover a value of the given register;

transmitting, to a plurality of multi-party computation (MPC) devices, a notification that the content distributor has requested an analysis of the presentations of the content distributed according to the set of distribution plans;

receiving, from each given MPC device among the plurality of MPC devices, a result share of the analysis of the presentation of the content distributed according to the set of distribution plans, wherein multiple result shares generated by the plurality of MPC devices are required to recover a final result of the analysis of the presentation of the content distributed according to the set of distribution plans;

transmitting, by the controller and to the content distributor, a set of result shares received from the plurality of MPC devices.

9. The non-transitory computer readable medium of claim 8, wherein the instructions cause the one or more data processing apparatus to cause operations comprising:

receiving, by the plurality of MPC devices and from each given online publisher among the multiple online publishers, the secret shares of each register of the multi-register sketch representing the presentations of the content at the electronic document provided by the given publisher;

computing, by the plurality of MPC devices and using the secret shares, a non-zero register count for each multi-register sketch received from the multiple online publishers without revealing individual values of registers in the multi-register sketch; and adding, by the plurality of MPC devices, random noise to the non-zero register count to obtain noisy result shares; and transmitting, by the plurality of MPC devices, the noisy result shares to the controller.

10. The non-transitory computer readable medium of claim 9, wherein computing the non-zero register count for each multi-register sketch comprises computing a number of bits having a value of 1 in a union of multiple multi-register sketches received from the multiple online publishers.

11. The non-transitory computer readable medium of claim 10, wherein the instructions cause the one or more data processing apparatus to perform operations comprising:

receiving, from the multiple online publishers, different bit strings; and performing a Boolean exclusive-or (XOR) on the different bit strings to obtain an output bit stream that is unknown to any of the multiple online publishers.

12. The non-transitory computer readable medium of claim 11, wherein the instructions cause the one or more data processing apparatus to perform operations comprising determining the random noise based, at least in part, on the output bit stream.

13. The non-transitory computer readable medium of claim 12, wherein determining the random noise comprises:

converting the output bit stream into a one-hot vector having a specified bit length; and computing a dot product of the one-hot vector and a quantile vector of the specified bit length, wherein the quantile vector represents quantiles of a discrete Gaussian distribution.

14. The non-transitory computer readable medium of claim 6, wherein the instructions cause the one or more data processing apparatus to perform operations comprising computing a frequency vector representing, for each number of presentations between one and a specified number, how many different users were presented content distributed according to the set of distribution plans different numbers of times between one and the specified number.

15. A system, comprising:
one or more memory devices; and
a controller, including one or more data processing apparatus, configured to access the one or more memory devices and execute instructions that cause the one or more data processing apparatus to perform operations comprising:
receiving, by the controller comprising one or more data processing apparatus and from a content distributor, plan data specifying a set of distribution plans that cause distribution of content with electronic documents from multiple online publishers;
transmitting, by the controller, instructions for each given publisher among the multiple online publishers to submit secret shares of each register of a multi-register sketch representing presentations of the content at an electronic document provided by the given online publisher, wherein multiple secret shares for a given register is required to recover a value of the given register;
transmitting, by the controller and to a plurality of multi-party computation (MPC) devices, a notification that the content distributor has requested an analysis of the presentations of the content distributed according to the set of distribution plans;
receiving, by the controller and from each given MPC device among the plurality of MPC devices, a result share of the analysis of the presentation of the content distributed according to the set of distribution plans, wherein multiple result shares generated by the plurality of MPC devices are required to recover a final result of the analysis of the presentation of the content distributed according to the set of distribution plans;
transmitting, by the controller and to the content distributor, a set of result shares received from the plurality of MPC devices.

16. The system of claim 15, further comprising:
the plurality of MPC devices configured to perform operations comprising:
receiving, by the plurality of MPC devices and from each given online publisher among the multiple online publishers, the secret shares of each register of the multi-register sketch representing the presentations of the content at the electronic document provided by the given publisher;
computing, by the plurality of MPC devices and using the secret shares, a non-zero register count for each multi-register sketch received from the multiple online publishers without revealing individual values of registers in the multi-register sketch; and
adding, by the plurality of MPC devices, random noise to the non-zero register count to obtain noisy result shares; and
transmitting, by the plurality of MPC devices, the noisy result shares to the controller.

17. The system of claim 16, wherein computing the non-zero register count for each multi-register sketch comprises computing a number of bits having a value of 1 in a union of multiple multi-register sketches received from the multiple online publishers.

18. The system of claim 17, wherein the plurality of MPC devices are configured to perform operations comprising:
receiving, from the multiple online publishers, different bit strings; and
performing a Boolean exclusive-or (XOR) on the different bit strings to obtain an output bit stream that is unknown to any of the multiple online publishers.

19. The system of claim 18, wherein the plurality of MPC devices are configured to perform operations comprising determining the random noise based, at least in part, on the output bit stream.

20. The system of claim 19, wherein determining the random noise comprises:
converting the output bit stream into a one-hot vector having a specified bit length; and
computing a dot product of the one-hot vector and a quantile vector of the specified bit length, wherein the quantile vector represents quantiles of a discrete Gaussian distribution.

* * * * *